US008116588B2

(12) United States Patent
Choe et al.

(10) Patent No.: US 8,116,588 B2
(45) Date of Patent: Feb. 14, 2012

(54) APPARATUS AND METHOD TO SYNTHESIZE OR COMBINE GENERATED IMAGES

(75) Inventors: Won-hee Choe, Gyeongju-si (KR); Seong-deok Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1164 days.

(21) Appl. No.: 11/762,128

(22) Filed: Jun. 13, 2007

(65) Prior Publication Data

US 2007/0292048 A1 Dec. 20, 2007

(30) Foreign Application Priority Data

Jun. 16, 2006 (KR) .................. 10-2006-0054567

(51) Int. Cl.
*G06K 9/36* (2006.01)
*G06K 9/00* (2006.01)
*G06K 9/32* (2006.01)
*G03F 3/08* (2006.01)
*H04N 9/74* (2006.01)

(52) U.S. Cl. ........ 382/284; 382/167; 382/294; 358/518; 348/584

(58) Field of Classification Search .................. None
See application file for complete search history.

(56) References Cited

U.S. PATENT DOCUMENTS

| | | | |
|---|---|---|---|
| 5,982,373 A * | 11/1999 | Inman et al. ............ | 345/419 |
| 6,825,884 B1 | 11/2004 | Horiuchi | |
| 6,912,324 B2 | 6/2005 | Fossum et al. | |
| 6,927,793 B1 | 8/2005 | Seitz et al. | |
| 7,019,274 B2 | 3/2006 | Yamada | |
| 7,057,645 B1 | 6/2006 | Hara et al. | |
| 2004/0136603 A1 | 7/2004 | Vitsnudel et al. | |
| 2005/0068426 A1 | 3/2005 | Kawasaki et al. | |
| 2006/0066750 A1 | 3/2006 | Henderson et al. | |

FOREIGN PATENT DOCUMENTS

| | | |
|---|---|---|
| CN | 1413411 | 4/2003 |
| CN | 1604613 | 4/2005 |
| EP | 1237363 B1 | 11/2000 |
| EP | 1237363 B1 * | 11/2000 |
| EP | 1237363 * | 4/2002 |
| JP | 2001148805 | 5/2001 |
| JP | 2005-303546 | 10/2005 |

OTHER PUBLICATIONS

European Communication Search Report dated Oct. 15, 2010 corresponding European Patent Application No. 07109404.9.
Japanese Office Action mailed Oct. 5, 2010 in related Japanese Patent Application No. 2007-158694 (2 pages).
Office Action issued in corresponding Chinese Patent Application No. 2007101090630 dated May 9, 2008.
English Abstract for European Patent No. EP 1237363, Sep. 4, 2002.
Japanese Office Action dated Sep. 30, 2009 and issued in corresponding Japanese Patent Application 2007-158694.

* cited by examiner

*Primary Examiner* — Randolph I Chu
(74) *Attorney, Agent, or Firm* — Staas & Halsey LLP

(57) ABSTRACT

An apparatus and method to generate an image in which images having different exposure amounts are generated, and by synthesizing the generated images, a high-sensitivity (or quality) image can be generated. The apparatus to generate an image includes an exposure adjustment unit to adjust an exposure amount, an image generation unit to generate a plurality of images of different exposure amounts and different resolutions, and an image synthesis unit to synthesize the plurality of generated images.

7 Claims, 8 Drawing Sheets

FIG. 3

| r1 | g1 | r2 | g2 |
|---|---|---|---|
| g5 | b1 | g6 | b2 |
| r3 | g3 | r4 | g4 |
| g7 | b3 | g8 | b4 |

FIG. 4

| R1 | G1 |
|---|---|
| G2 | B1 |

APPARATUS AND METHOD TO SYNTHESIZE OR COMBINE GENERATED IMAGES

CROSS-REFERENCE TO RELATED APPLICATION

This application claims the benefit of Korean Application No. 2006-54567, filed Jun. 16, 2006 in the Korean Intellectual Property Office, the disclosure of which is incorporated herein by reference.

BACKGROUND OF THE INVENTION

1. Field of the Invention

Aspects of the present invention relate to an image generation apparatus and method, and more particularly, to an image generation apparatus and method in which, by adjusting exposure amounts and resolutions thereof, a plurality of images are generated, and by synthesizing the plurality of the generated images, an image having a high dynamic range is generated.

2. Description of the Related Art

In general, when an apparatus capable of taking an image, such as a digital camera and/or a camcorder, takes a picture image of a subject against the light, in order to improve the sensitivity of the picture image, various images having different exposure amounts are generated, synthesized, and then provided to a user. For example, when an image of the subject is taken against the light, and if the exposure amount thereof is small, the contrast of the image becomes high due to a short exposure time. Accordingly, edges in the image become clear. On the other hand, if the exposure amount thereof is large, colors of the image become clear due to a long exposure time. Accordingly, by synthesizing the image with the large exposure amount and the image with the small exposure amount, a high-sensitivity (or quality) image is generated.

FIG. 1 is a diagram illustrating a related art process to generate an image. More specifically, a device (not shown) capable of taking an image generates an image 11 with a small exposure amount, and an image 12 with a relatively large exposure amount than that of the image 11, and by synthesizing the generated images 11 and 12, a high-sensitivity (or quality) image 13 is generated.

Thus, in order to generate images having different exposure amounts, an image with a small exposure amount and an image with a large exposure amount are generated through different exposure times, respectively, and then synthesized. However, when generating the image with the large exposure amount, a user is inconvenienced by the required long exposure time because the user has to maintain a certain position for a predetermined time while the image is taken with a digital camera. Also, if the position of the subject changes while the user is maintaining the certain position, the image with the large exposure amount and the image with the small exposure amount become different and makes it difficult to generate a normal image. Furthermore, since the user keeps the certain position for the predetermined time, trembling of the user's hands occurs, causing blurring of the generated image.

In order to lessen the inconvenience to the user, several remedial methods call for changing the structure of an image pickup device, such as modifying the arrangement of color filters or differentiating the sensitivities of filters. However, these methods require additional processing operations by the image pickup device, such as demosaicing of the color filters, and a white balancing method.

An example of such changes is shown in U.S. Patent Publication No. 2006-0066750, which discloses an image sensor having a pixel array with odd rows of the pixel array made to have a short exposure time and even rows made to have a long exposure time. By adding the outputs of each pair of pixels from the odd rows and the even rows, a wide dynamic range of an image is enabled. However, the above method still requires a long exposure time and still does not provide a method of preventing blurring of an image due to trembling of hands.

SUMMARY OF THE INVENTION

Accordingly, a method of preventing or reducing the effects of trembling hands (or a shaking of a device) without changing the structure of an image pickup apparatus when images with different exposure amounts are generated is needed.

Aspects of the present invention provide an image generating apparatus and method capable of preventing or reducing the occurrence of blurring of an image due to trembling of hands (or a shaking of a device) by reducing an exposure time, and without a change in the structure of an image pickup apparatus to take a picture of a subject when an image with a large exposure amount is generated.

According to an aspect of the present invention, an apparatus to generate an image includes an exposure adjustment unit to adjust an exposure amount of a plurality of images, an image generation unit to generate the plurality of images by adjusting an exposure amount and a resolution thereof, and an image synthesis unit to synthesize the plurality of generated images.

According to another aspect of the present invention, a method to generate an image includes generating a plurality of images by adjusting an exposure amount and a resolution of the plurality of images, making the resolutions of the generated plurality of images identical, and synthesizing the plurality of images having the identical resolutions.

According to another aspect of the present invention, an apparatus to generate an image includes an image generation unit to generate a first image having a first exposure amount and a first resolution, the first resolution corresponding to a plurality of pixels of the first image, and a second image having a second exposure amount and a second resolution, the second resolution corresponding to a plurality of pixels of the second image, and a combiner to combine the generated first and second images, wherein each of the plurality of pixels of the second image corresponds two or more of the plurality of pixels of the first image.

According to another aspect of the present invention, a method of generating an image includes generating a first image having a first exposure amount and a first resolution, the first resolution corresponding to a plurality of pixels of the first image, and a second image having a second exposure amount and a second resolution, the second resolution corresponding to a plurality of pixels of the second image, and combining the generated first and second images, wherein each of the plurality of pixels of the second image corresponds two or more of the plurality of pixels of the first image.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects, taken in conjunction with the accompanying drawings of which:

FIG. 3 is a diagram illustrating pixels of a first image according to an aspect of the present invention;

FIG. 4 is a diagram illustrating pixels of a second image according to an aspect of the present invention;

DETAILED DESCRIPTION OF THE EMBODIMENTS

Figure 1:
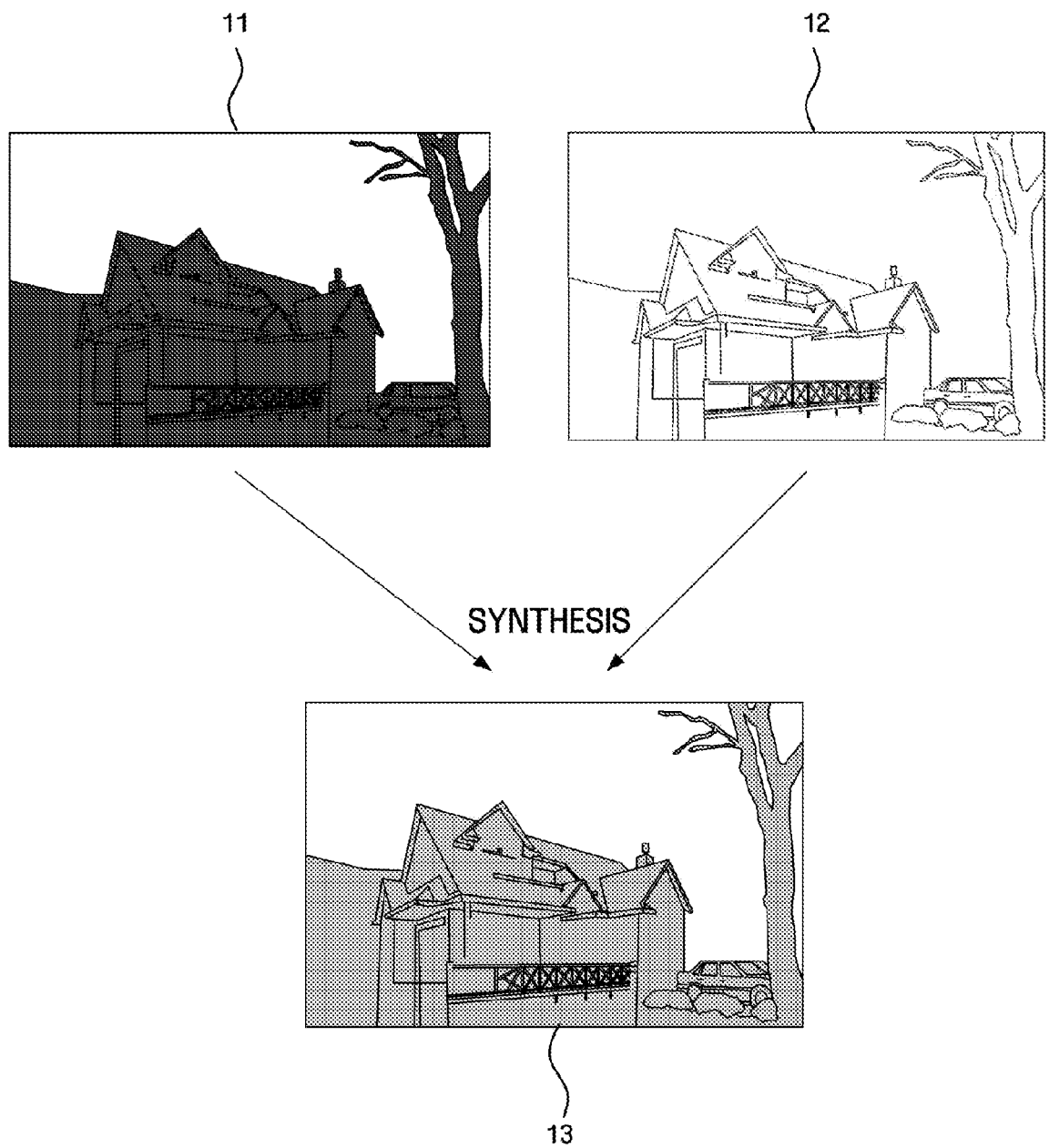
FIG. 1 is a diagram illustrating a related art process to generate an image.

Reference will now be made in detail to the aspects of the present invention, examples of which are illustrated in the accompanying drawings, wherein like reference numerals refer to the like elements throughout. The aspects are described below in order to explain the present invention by referring to the figures.

A process and method of generating an image will be described below with reference to flowchart illustrations and/or block diagrams of methods, systems, computer program products and data and/or system architecture structures according to aspects of the invention. It will be understood that each block of the illustrations, and/or combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, and create ways to implement the functions/acts specified in the block or blocks.

These computer program instructions may also be stored in a computer-readable memory or storage that can direct a computer or other programmable data processing apparatus to function in a particular manner, such that the instructions stored in the computer-readable memory or storage produce an article of manufacture including instructions which implement the function/act specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

In addition, each block may represent a module, a segment, or a portion of code, which may comprise one or more executable instructions to implement the specified logical functions. It should also be noted that in other implementations, the functions noted in the blocks may occur out of the order noted or in different configurations of hardware and software. For example, two blocks shown in succession may, in fact, be executed substantially concurrently, or the blocks may sometimes be executed in the reverse order, depending on the functionality involved.

Figure 2:
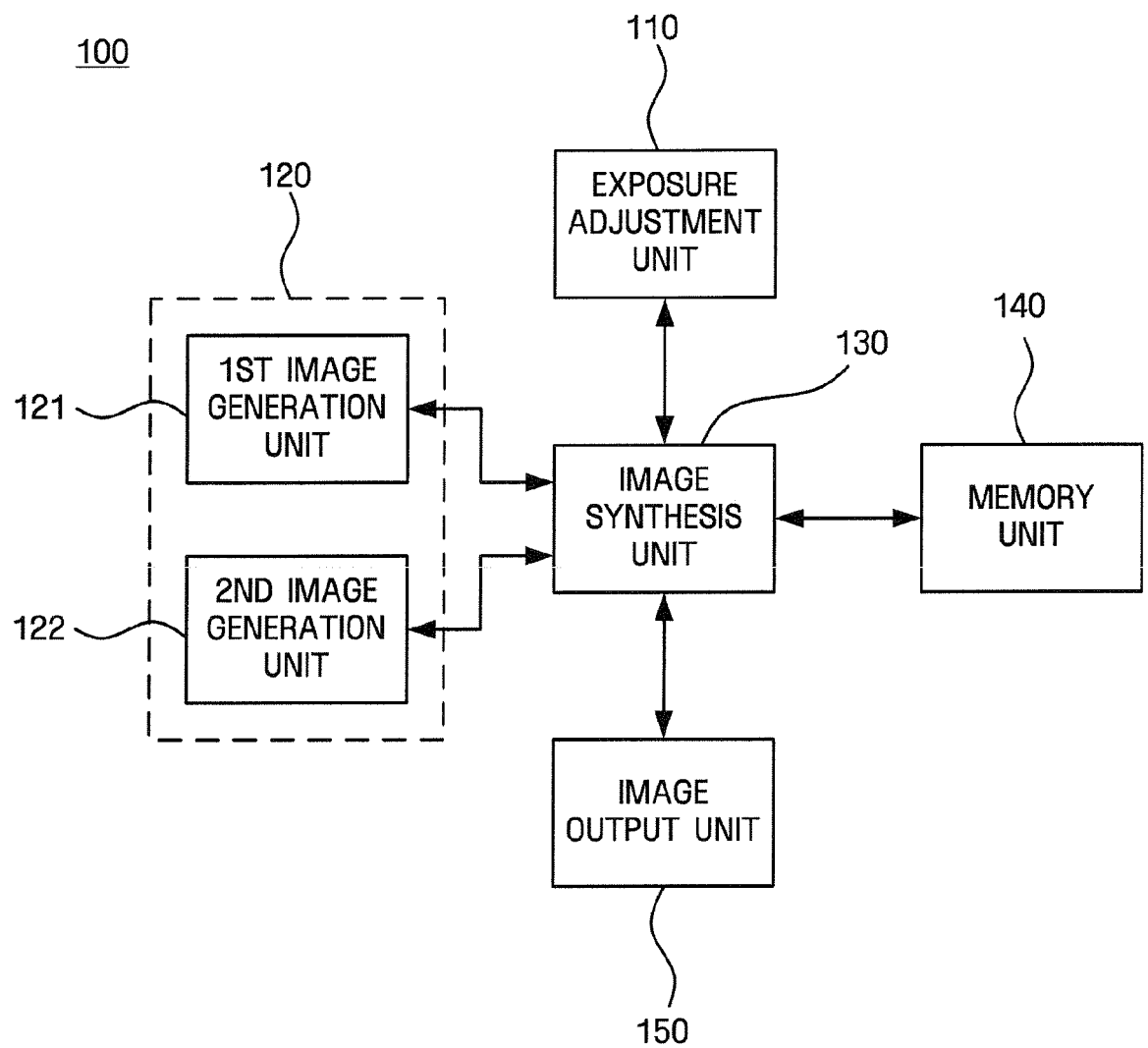
FIG. 2 is a block diagram illustrating an apparatus to generate an image according to an aspect of the present invention.

FIG. 2 is a block diagram illustrating an apparatus 100 to generate an image according to an aspect of the present invention. In the non-limiting aspect shown, the image generating apparatus 100 includes an exposure adjustment unit 110, an image generation unit 120, an image synthesis unit (or a combiner) 130, a memory unit 140, and an image output unit 150. In various non-limiting aspects, the image generating apparatus 100 may be a digital camera equipped with a module capable of photographing an image or moving pictures (or a picture or video), a camcorder, or other devices. However, aspects of the present invention are not limited thereto and the image generating apparatus 100 may be implemented as a variety of devices, including a camera-equipped cellular phone capable of photographing an image or moving pictures, a personal digital assistant (PDA), or other devices. The following aspect of the present invention will now be explained with reference to the image generating apparatus 100 being a digital camera capable of taking an image of a predetermined subject.

In this non-limiting aspect of a digital camera, the exposure adjustment unit 110 can adjust an exposure amount of the image by adjusting the size of an iris (not shown) and/or the speed of a shutter (not shown), to take an image. On the other hand, in another non-limiting aspect of a camera sensor which does not have the iris or the mechanical shutter, an exposure amount to photograph the predetermined subject can be adjusted by varying a reading time of an amount of light received by an optical sensor thereof. In the above, though the digital camera is used as an example of the aspects of the present invention, it should be understood that such is just an example to aid understanding of the various aspects of the present invention and the aspects of present invention can be similarly or equally applied to a variety apparatuses capable of taking images and moving pictures.

In the non-limiting aspect shown, the image generation unit 120 generates a plurality of images having different exposure amounts and resolutions thereof, and each of the generated plurality of images with different exposure amounts can be adjusted by the exposure adjustment unit 110 described above. In various aspects, the resolution of each of the plurality of generated images can be determined according to a number of pixels that belong to each of the plurality of the generated images.

More specifically, in an aspect of the present invention, the image generation unit 120 may include a first image generation unit (or a first image generation section) 121 to generate a first image and a second image generation unit (or a second image generation section) 122 to generate a second image having a lower resolution than that of the first image. It should be understood that the number of image generating sections is not limited thereto. In other aspects, there may be a single image generation section to generate one or more images, while in other aspects, there may be two or more image generating sections for each to generate one or more images.

In the aspect shown, the first image generation unit (or section) 121 generates a first image having a resolution that corresponds to the total number of pixels which may be included in a CMOS image sensor (CIS) of the image generating apparatus 100, and the second image generation unit (or section) 122 generates a second image having a lower resolution than that of the first image, by using as one pixel, a number of pixels of an identical color from among all of the pixels. To elaborate, when color filters of respective pixels that are included in the CIS of the image generating apparatus 100 are designated as r1 through r4, g1 through g4, and b1 through b4, as illustrated in FIG. 3, the first image may have a resolution corresponding to r1 through r4, g1 through g4, and b1 through b4, while, as illustrated in FIG. 4, the second image may have a resolution corresponding to R1, G1, G2, and B1. As shown, in this aspect, the number of pixels of the second image is reduced to ¼ of that of the first image. In the aspect shown, r and R indicate red filters (or color), g and G indicate green filters (or color), and b and B indicate blue filters (or color). In the non-limiting aspect shown, R1 may be r1+r2+r3+r4, G1 may be g1+g2+g3+g4, and B1 may be b1+b2+b3+b4. Accordingly, each pixel of the second image has a group of corresponding pixels of the first image. In various aspects, G2 may be one or more of the remaining green filters (or color) or may be a predetermined filter (or color). The types of image sensors are not limited thereto. In other aspects, various sensors, such as active pixel sensors (APS), and/or charge-coupled devices (CCDs) may be used.

Furthermore, in the non-limiting aspect shown, the first image generated by the first image generation unit 110 may have an exposure amount equal to or less than that of the second image generated by the second image generation unit 120. That is, the exposure time to generate the second image may be equal to or longer than that to generate the first image. As shown, each pixel belonging to the second image can be formed by combining a plurality of filters of an identical color of the first image. Also, an exposure time, an exposure amount and the brightness of a pixel are generally in a proportional relationship. Accordingly, the exposure time required to generate the second image is reduced in proportion to the number of pixels of the first image that are incorporated into each pixel belonging to the second image. For example, when each pixel of the second image is formed with four pixels of the first image as described above, the brightness of the pixel in the second image will be four times higher, for example. Thus, the exposure time required to generate the second image can be reduced to ¼ of the exposure time to generate the second image if only one pixel is used. Accordingly, when an image of a dark scene is taken, the exposure time thereof is reduced and the problem arising from trembling of hands that occurs when a long exposure time is used to attain the brightness of pixels can be avoided due to the reduction of the exposure time. In various aspects, because the exposure time to obtain the second image is reduced relative to the reduced number of pixels, the overall exposure time may also be reduced. In various aspects, the number of pixels of the first image that is incorporated into the pixels of the second image need not be four, and such may be a multiple of four or any other number.

On the other hand, when an image of a predetermined subject is taken against the light through the image generating apparatus 100, and if the exposure amount is relatively small, a high contrast image is obtained whereby the edges thereof become clear. Meanwhile, if the exposure amount is relatively large, a low contrast image is obtained whereby the edges thereof become unclear but colors and details of the predetermined subject become clear.

Accordingly, a life-like image that is much closer to an image of the predetermined subject as perceived by human eyes can be obtained by making the exposure amounts of the first and second images generated by the respective first image generation unit 110 and the second image generation unit 120 different from each other, and synthesizing the first and second images through the image synthesis unit 130 to obtain a final image. This image synthesis method will be explained below in greater detail with regard to the image synthesis unit 130. In various non-limiting aspects, synthesizing refers to combining or unifying the whole, parts, and/or elements thereof.

In the non-limiting aspect shown, the image synthesis unit 130 generates an image by synthesizing the first and second images generated by the respective first and second image generation units 110 and 120, and outputting the image synthesized by the image synthesis unit 130 through the image output unit 150. Hereinafter, the image synthesized by the image synthesis unit 130 will be referred to as a 'final image'.

In the non-limiting aspect shown, the synthesis of the first and second images in the image synthesis unit 130 can be classified as a case where the resolution of the second image is increased to that of the first image and then have the two images be synthesized (hereinafter referred to as a 'first synthesis method'), and a case where the resolution of the first image is decreased to that of the second image and then have the two images synthesized (hereinafter referred to as a 'second synthesis method'). The first synthesis method and the second synthesis method will now be explained in that order.

In the first synthesis method, the resolution of the second image is increased to that of the first image through linear interpolation, for example. Then, the first image and the second image (with the increased resolution) are synthesized. In the second synthesis method, the resolution of the first image is decreased to that of the second image. Then, the first image (with the decreased resolution) and the second image are synthesized. In this aspect, the decrease of the first image may be done through linear interpolation. Of course, in other aspects, it should be understood that the second image may be decreased or the first image may be increased by linear interpolation. In other aspects, techniques to increase and/or decrease the various images may be other than the linear interpolation technique. In various aspects, such techniques may use a ratio, a predetermined value, and/or a non-linear value to change the resolution.

In the non-limiting aspect shown, the final image generated in the first synthesis method can be output directly through the image output unit 150 without a separate processing operation. However, since the final image generated in the second synthesis method has the resolution thereof decreased to that of the second image, the resolution of the synthesized image in the second synthesis method is increased to that of the first image and, the final image can be output through the image output unit 150, though not required. In other aspects, the resolution of the final image need not be increased to that of the original first image.

In addition to the first and the second synthesis methods which have been described above, another applicable synthesis method includes having the image synthesis unit 130 synthesize an image using a plurality of pixels of the first image that takes account only of the brightness and color information of a pixel belonging to the second image having a lower resolution than the first image. In this way, a final image can be obtained.

In the non-limiting aspect shown, the memory unit 140 stores the first image, the second image, and the final image generated by the first image generation unit 121, the second image generation unit 122, and the image synthesis unit 130, respectively. While the aspects of the present invention have shown that the first image, the second image, and the final image are stored in one memory unit 140, aspects of the present invention are not limited to this illustrated example. Accordingly, the first image, the second image, and the final image may be stored in one or more separate memory units 140, respectively.

Figure 5:
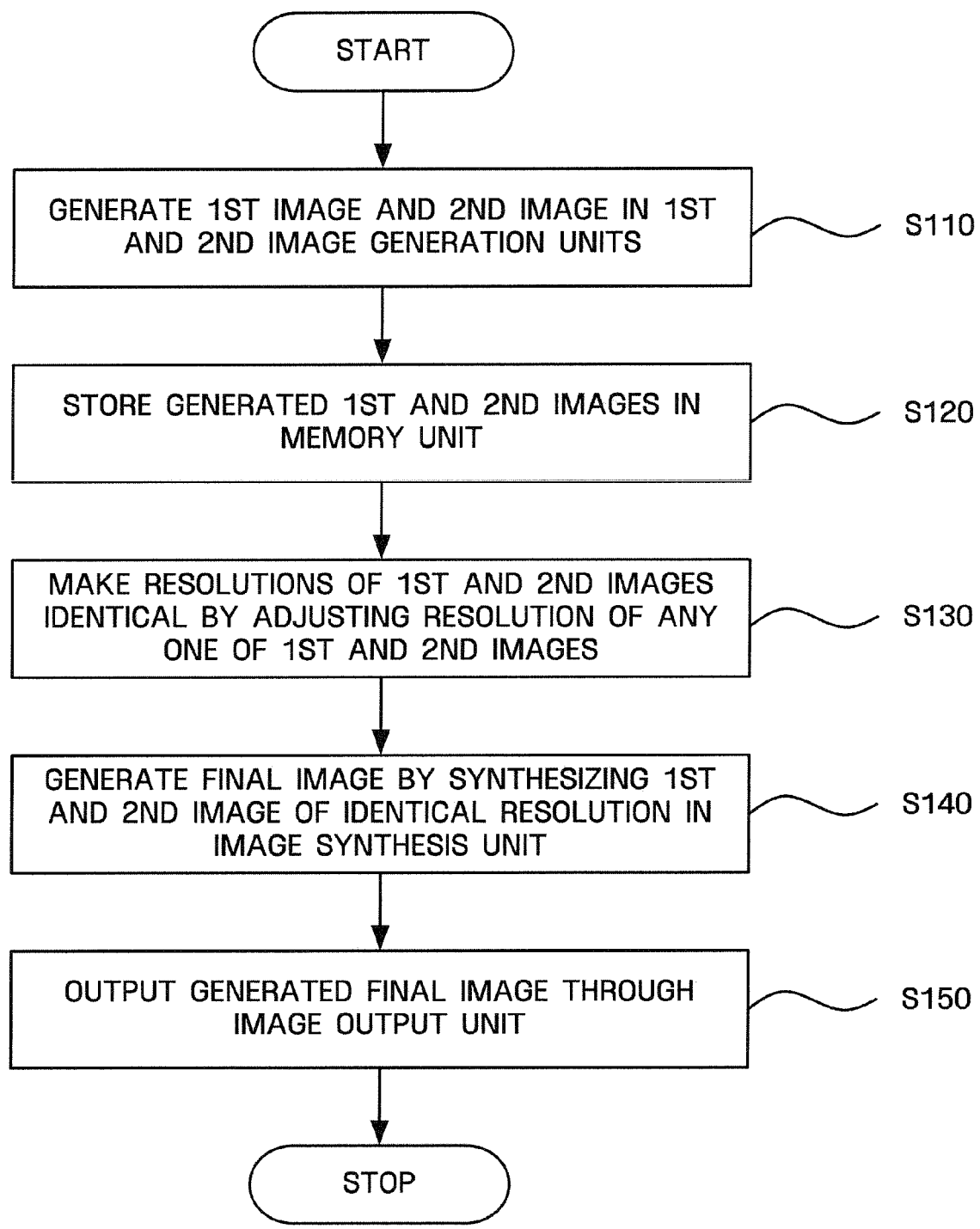
FIG. 5 is a diagram illustrating a method of generating an image according to an aspect of the present invention.

FIG. 5 is a diagram illustrating a method of generating an image according to an aspect of the present invention. In the non-limiting aspect shown in FIG. 5, a first image and a second image, each having a different exposure amount and a different resolution, are generated in the first image generation unit 121 and the second image generation unit 122, respectively, in operation S110. This aspect will be explained with reference to a case where the first image has a higher resolution and a smaller exposure amount than those of the second image, but the aspects of the present invention are not limited thereto. Also, a vice versa situation where the second image has a higher resolution and a smaller exposure amount than those of the first image is within the scope of the present invention.

As shown in the non-limiting aspect, when the second image requiring a longer exposure time than that of the first image is generated, the second image is generated so that the resolution of the second image can be lower than that of the first image. In this way, the exposure time thereof can be reduced for the second image. That is, assuming that the exposure time required to generate the second image is A and the number of the pixels of the first image that are included in each of the pixels of the second image is N, then the exposure time required to generate the second image can be reduced to A/N because of the pixels of the first image that are include in each of the pixels of the second image, which may be referred to as overlapping pixels.

In the non-limiting aspect shown, the generated first and second images are stored in the memory unit 140, in operation S120. In the non-limiting aspect shown, by adjusting the resolution of any one of the stored first and second images, the image synthesis unit 130 makes the resolutions of the first and second images identical, in operation S130. More specifically, the image synthesis unit 130 can make the resolutions of the first and second images identical by reducing the resolution of the first image or by increasing the resolution of the second image. Although discussed in terms of matching the resolutions to be identical, in various aspects, the matching of the resolution of the first and second images need not be exactly identical, but simply comparable, or even be non-matching. In other aspects, instead of a resolution of one image being matched with a resolution of another, the resolutions of the one and the other images may approach a third resolution, such as by convergence, whereby the third resolution maybe an intermediate resolution or may be a resolution that is even higher or lower than both of the resolutions.

In the non-limiting aspect shown, the image synthesis unit 130 synthesizes the first and second images that have the identical resolutions to thereby generate a final image, in operation S140.

In the non-limiting aspect shown, the image output unit 150 outputs the generated final image, in operation S150. In the aspect shown, when the resolution of the second image is increased and the two images are synthesized, the final image that is generated in operation S140 is output without change. However, when the resolution of the first image is decreased and the two images are synthesized, the resolution of the final image generated in operation S140 is decreased to that of the second image. Accordingly, the resolution of the generated final image is increased to that of the original first image and the final image is outputted, though not required. In other aspects, the final outputted resolution of the final image need not be changed and may simply be outputted, or may be greater than, less than, or equal to the original resolution of the first and/or second images.

Figure 6:
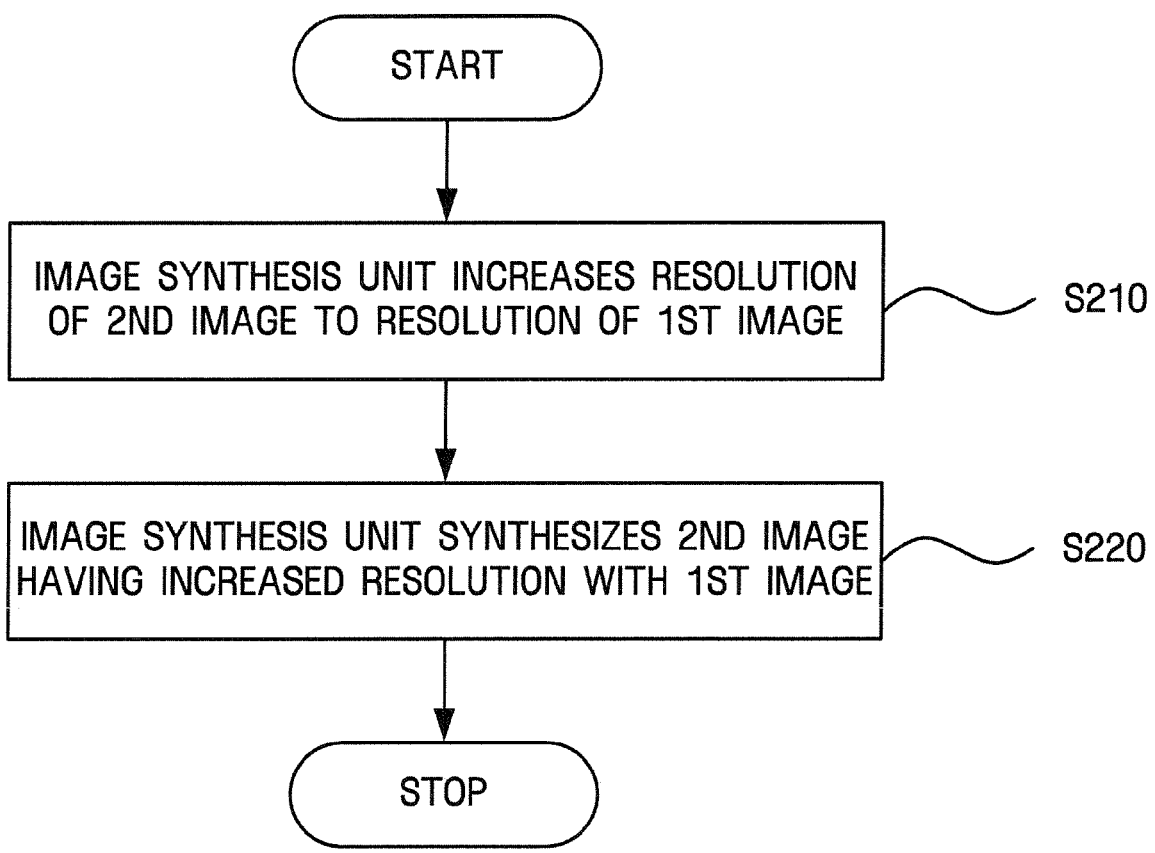
FIG. 6 is a diagram illustrating a first synthesis method according to an aspect of the present invention.

The method of generating a final image by synthesizing a first image and a second image in the image synthesis unit 130 will now be explained in greater detail. FIG. 6 is a diagram illustrating a first synthesis method according to an aspect of the present invention. As illustrated in FIG. 6, the image synthesis unit 130 increases the resolution of the second image so that the resolution of the second image can be the same as that of the first image, in operation S210. In this aspect, the resolution of the second image can be adjusted through linear interpolation, or other techniques, as described above, but the adjustment method is not limited thereto. The image synthesis unit 130 synthesizes the second image (having the increased resolution) with the first image to generate a final image, in operation S220.

Figure 7:
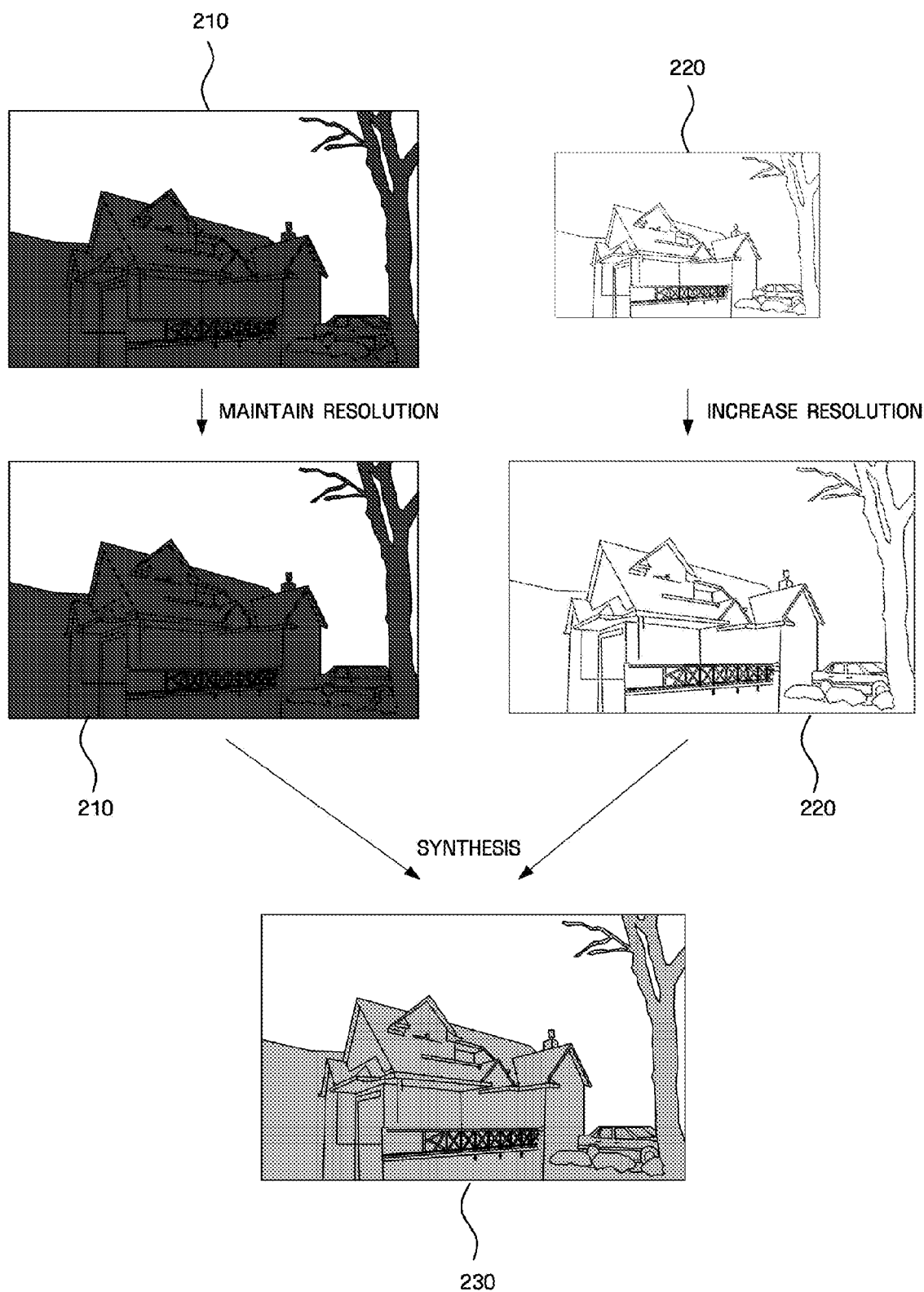
FIG. 7 is a diagram illustrating a process of synthesizing images according to the first synthesis method of FIG. 6.

FIG. 7 is a diagram illustrating a process of synthesizing images according to the first synthesis method of FIG. 6. As illustrated in FIG. 7, a first image 210 and a second image 220 are generated in the first image generation unit 121 and the second image generation unit 122, respectively. As shown, the generated first image 210 has a higher contrast than that of the first image 220 and has clear edges, while the second image 220 has clearer colors than those of the first image 210. As shown, the image synthesis unit 210 maintains the resolution of the first image 210 and increases the resolution of the second image 220 so that the resolution of the second image 220 can be the same as that of the first image 210. Although discussed in reference to the resolution of the first and second images 210, 220 being made same, such is not required, as discussed above.

Then, in the non-limiting aspect shown, the image synthesis unit 130 synthesizes the second image 220 having the increased resolution with the first image 210 and generates a final image 230. As shown, the generated final image 230 has a contrast between those of the first image 210 and the second image 220 and can have clear colors together with clear edges.

Figure 8:
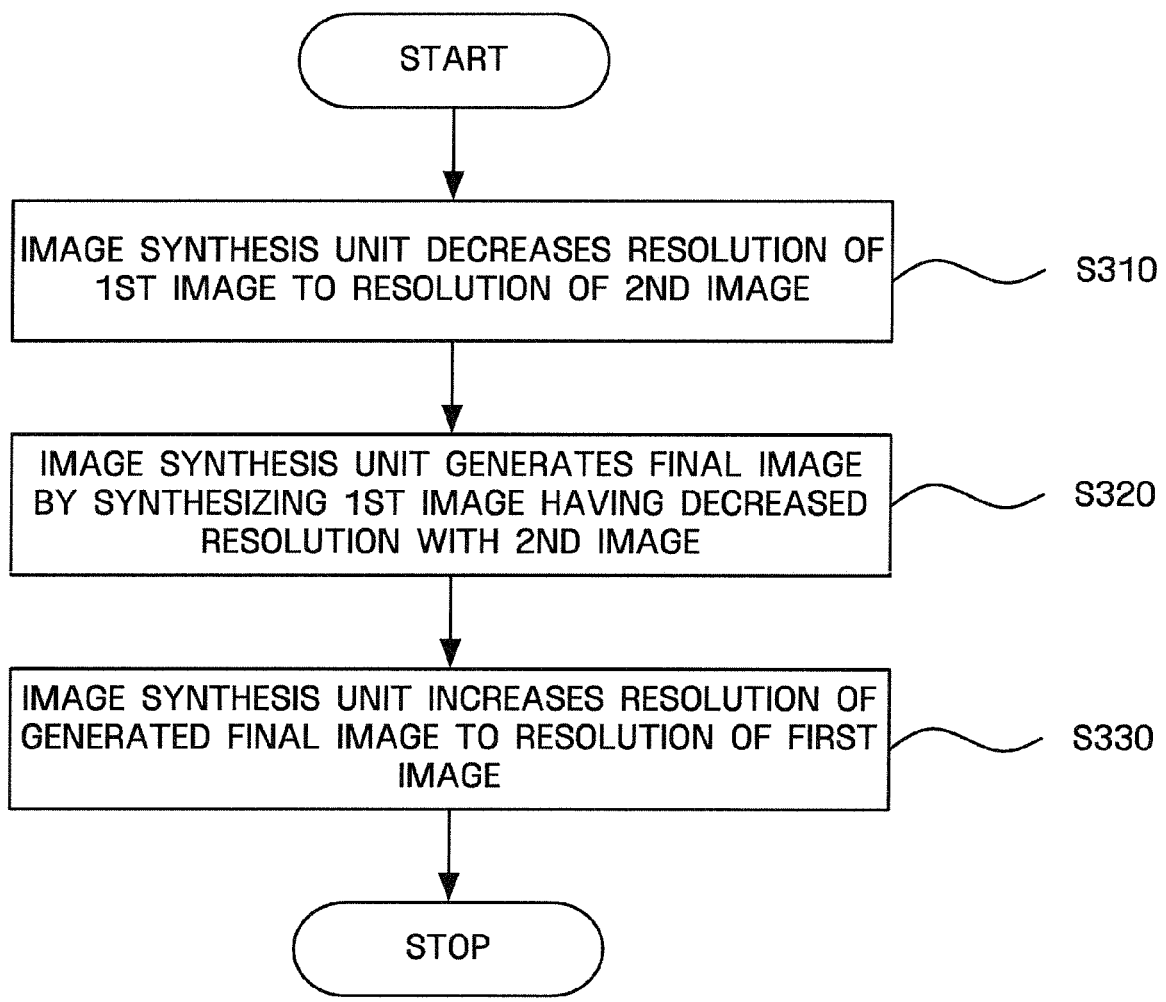
FIG. 8 is a diagram illustrating a second synthesis method according to an aspect of the present invention.

FIG. 8 is a diagram illustrating a second synthesis method according to an aspect of the present invention. In the non-limiting aspect as illustrated in FIG. 8, the image synthesis unit 130 first decreases the resolution of a first image so that the resolution of the first image can be the same as that of a second image, in operation S310. Then, the image synthesis unit 130 synthesizes the first image (having the decreased resolution) with the second image and generates a final image, in operation S320. The image synthesis unit 130 increases the resolution of the generated final image to that of the original resolution of the first image, in operation S330. Although discussed in reference to the resolution of the first and second images being made the same, such is not required, as discussed above.

Figure 9:
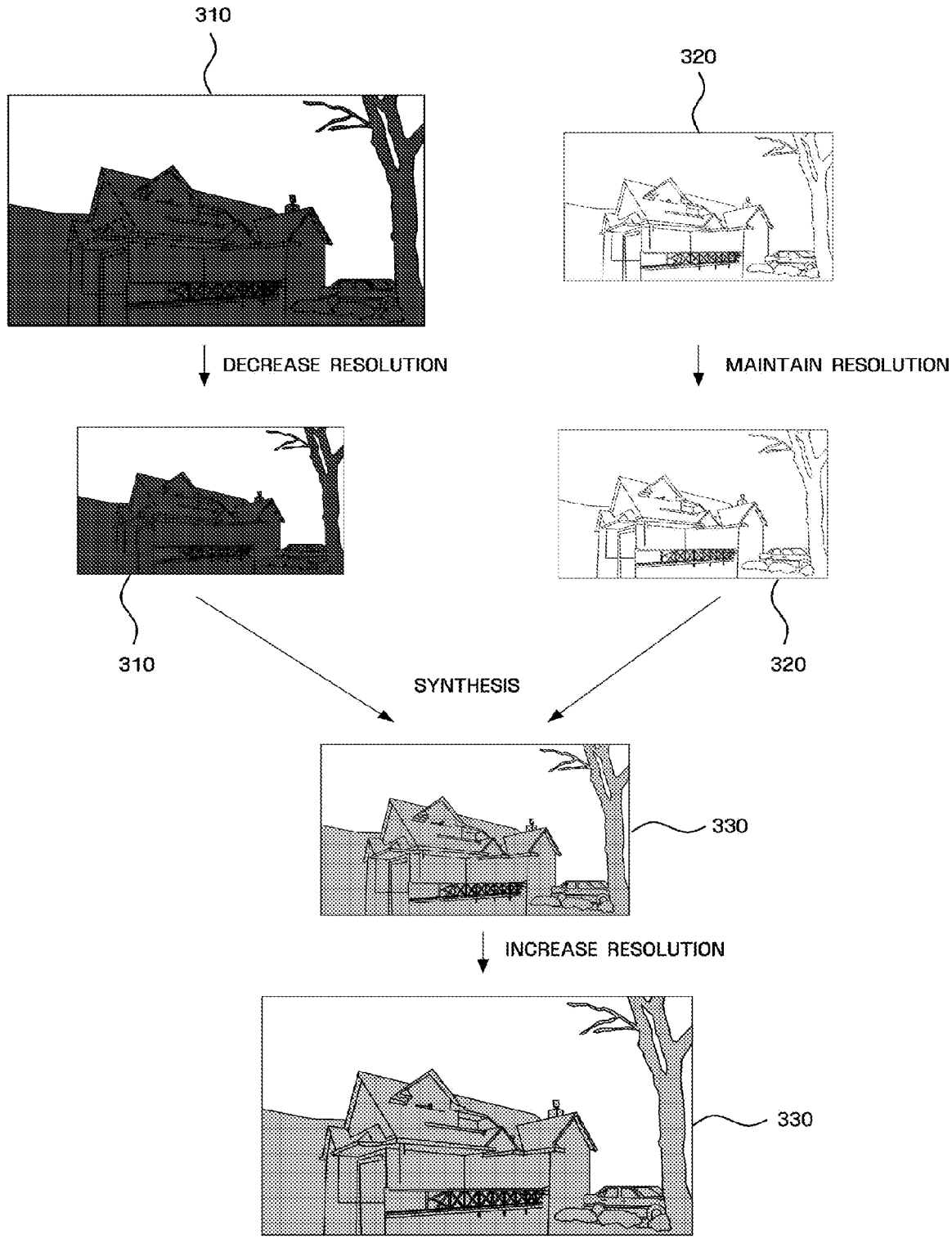
FIG. 9 is a diagram illustrating a process of synthesizing images according to the second synthesis method of FIG. 9.

FIG. 9 is a diagram illustrating a process of synthesizing images according to the second synthesis method of FIG. 8. As illustrated in FIG. 9, a first image 310 and a second image 320 are generated in the first image generation unit 121 and the second image generation unit 122, respectively. As shown, the image synthesis unit 210 maintains the resolution of the second image 320 and decreases the resolution of the first image 310 so that the resolution of the first image 310 can be the same as that of the second image 320. Also, the generated first image 310 has a higher contrast than that of the second image 320 and has clear edges, while the second image 320 has clearer colors than that of the first image 310. Although discussed in reference to the resolution of the first and second images 310, 320 being made same, such is not required, as discussed above. In other aspects, the final outputted resolution of the final image need not be changed and may simply be outputted, or may be greater than, less than, or equal to the original resolution of the first and/or second images.

Then, in the non-limiting aspect shown, the image synthesis unit 130 synthesizes the first image 310 having the decreased resolution with the second image 320, and generates a final image 330. As shown, since the resolution of the final image 330 generated in the image synthesis unit 130 is decreased to that of the second image 320, the resolution of the generated final image 330 is increased to the original resolution of the first image 310.

The term 'module', as used in the aspects of the present invention, refers to, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

In an aspect of the present invention, the first image and the second image may be obtained in a way so that while taking an image, the first image is obtained by a first cutting-off of the exposure time or stopping of the exposure thereof, and the second image is obtained by a later second cutting-off of the exposure time or a later stopping of the exposure thereof.

In various aspects, the image generating apparatus and method according to aspects of the present invention have the following and/or other benefits.

First, without changing the structure of an image pickup apparatus taking an image, an image of a wide dynamic range can be generated.

Second, an exposure time can be reduced and an additional processing operation such as compensation for effects of trembling hands (or shaking of the device) is not needed, or the need thereof is reduced. As a result, convenience of a user increases.

Although a few aspects of the present invention have been shown and described, it would be appreciated by those skilled in the art that changes may be made in the aspects without departing from the principles and spirit of the invention, the scope of which is defined in the claims and their equivalents.

What is claimed is:

1. A method of generating an image, the method comprising:
   generating a plurality of images by adjusting an exposure amount and a resolution of the plurality of images;
   making the resolutions of the generated plurality of images identical; and
   synthesizing the plurality of images having the identical resolutions, wherein the generating of the plurality of images comprises:
   generating a first image, and
   generating a second image with a lower resolution than that of the first image, and, wherein the synthesizing of the images comprises:
   decreasing the resolution of the first image to that of the second image, and
   synthesizing the first image having the decreased resolution and the second image.

2. The method of claim 1, wherein the synthesizing of the images comprises increasing the resolution of the synthesized image to an original resolution of the first image.

3. A method of generating an image, the method comprising:
   generating a plurality of images by adjusting an exposure amount and a resolution of the plurality of images;
   making the resolutions of the generated plurality of images identical; and
   synthesizing the plurality of images having the identical resolutions, wherein the generating of the plurality of images comprises:
   generating a first image, and
   generating a second image with a lower resolution than that of the first image, and wherein the synthesizing of the image comprises synthesizing an image from the first image having the plurality of pixels and the second image by referring to only the brightness and color information of a pixel belonging to the second image wherein combining of the first and second images includes first reducing the first resolution of the first image to that of the second resolution of the second image.

4. A method of generating an image, comprising;
   generating a first image having a first exposure amount and a first resolution, the first resolution corresponding to a plurality of pixels of the first image, and a second image having a second exposure amount and a second resolution, the second resolution corresponding to a plurality of pixels of the second image;
   combining the generated first and second images, wherein each of the plurality of pixels of the second image corresponds two or more of the plurality of pixels of the first image; and
   reducing an exposure time corresponding to the second image in proportion to the number of the plurality of pixels of the first image that corresponds to each of the plurality of pixels of the second image wherein combining of the first and second images includes first reducing the first resolution of the first image to that of the second resolution of the second image.

5. A method of generating an image, comprising;
   generating a first image having a first exposure amount and a first resolution, the first resolution corresponding to a plurality of pixels of the first image, and a second image having a second exposure amount and a second resolution, the second resolution corresponding to a plurality of pixels of the second image; and
   combining the generated first and second images, wherein each of the plurality of pixels of the second image corresponds two or more of the plurality of pixels of the first image,
   wherein the first resolution is higher than the second resolution and the first exposure amount is smaller than the second exposure amount wherein combining of the first and second images includes first reducing the first resolution of the first image to that of the second resolution of the second image.

6. A method of generating an image, comprising:
   generating a first image having a first exposure amount and a first resolution, the first resolution corresponding to a plurality of pixels of the first image, and a second image having a second exposure amount and a second resolution, the second resolution corresponding to a plurality of pixels of the second image; and combining the generated first and second images, wherein each of the plurality of pixels of the second image corresponds two or more of the plurality of pixels of the first image, wherein combining of the first and second images includes first reducing the first resolution of the first image to that of the second resolution of the second image.

7. The method of claim 6, further comprising enlarging a resolution of the combined image to that of an original first resolution of the first image.

* * * * *